United States Patent [19]

Nosse et al.

[11] Patent Number: 4,844,211
[45] Date of Patent: Jul. 4, 1989

[54] QUICK CONNECT AND DISCONNECT YOKE ASSEMBLY

[75] Inventors: John G. Nosse, Grafton; Clyde R. Wolfli, Elyria, both of Ohio

[73] Assignee: Allied-Signal, Inc., Morristown, N.J.

[21] Appl. No.: 207,423

[22] Filed: Jun. 16, 1988

[51] Int. Cl.4 ............................................. F16D 51/00
[52] U.S. Cl. ................... 188/79.55; 188/330; 403/24; 403/299
[58] Field of Search ........................ 188/79.55, 329, 330, 188/332, 338, 339, 79.51, 196 R; 403/299, 287, 315, 326, 327, 376, 24, 11, 21, 378, 79, 43–48, 379; 285/305; 74/522

[56] References Cited

U.S. PATENT DOCUMENTS

| | | | |
|---|---|---|---|
| 3,949,840 | 4/1976 | Cumming et al. | 188/79.55 |
| 4,146,115 | 3/1979 | Tazelaar | 403/287 |
| 4,421,211 | 12/1983 | Hoffman et al. | 188/79.55 |
| 4,580,665 | 4/1986 | Saxton et al. | 188/79.55 |
| 4,643,279 | 2/1987 | Skurka | 188/79.55 |

Primary Examiner—Douglas C. Butler
Attorney, Agent, or Firm—Ken C. Decker; William N. Antonis

[57] ABSTRACT

A brake actuating lever is connected to a fluid actuator through a thrust rod extending from the fluid actuator and a yoke pivotally mounted on the lever. An adaptor is movable along the thrust rod and is received within the yoke when the rod and yoke are to be connected. A split retaining ring engages mating grooves in the adaptor and in the yoke to provide a releasable connection between the yoke and the thrust rod.

11 Claims, 2 Drawing Sheets

QUICK CONNECT AND DISCONNECT YOKE ASSEMBLY

This invention relates to a connecting mechanism between an actuator thrust rod and a brake actuating lever in a vehicle braking system.

Fluid pressure braking systems for heavy duty vehicles include a fluid actuator which is communicated to a source of air pressure when a brake application is effected. The fluid actuator strokes a brake actuating lever in order to mechanically actuate the vehicle foundation brake. Brake actuating levers include an adjustment mechanism which either automatically or manually effects adjustment when the braking clearances become too great. A yoke assembly is pivotally connected to the lever and to the thrust rod which transmits movement of the actuator to the lever. However, attachment of the thrust rod to the yoke assembly is often quite difficult, because the adjusting lever is often installed adjacent other components of the vehicle drive line, and requires a number of tools in order to effect connection and disconnection. The device disclosed in U.S. Pat. No. 4,146,115 facilitates assembly of the yoke to the thrust rod, but does not permit easy disassembly of the connection, and does not permit easy inspection to determine if the assembly is indeed assembled correctly.

The present invention provides a quick-connect mechanism for attaching the thrust rod to the yoke of the brake actuating lever, but also facilitates disassembly of the thrust rod from the yoke assembly. Accordingly, the thrust rod may be quickly and easily connected to the yoke when the vehicle is assembled. When the vehicle is serviced, the mechanic can quickly disconnect the thrust rod from the yoke, and, when the servicing of the brakes is completed, can similarly reconnect the thrust rod to the yoke.

These and other features of the invention will become apparent from the following description, with reference to the accompanying drawings, in which.

Figure 1:
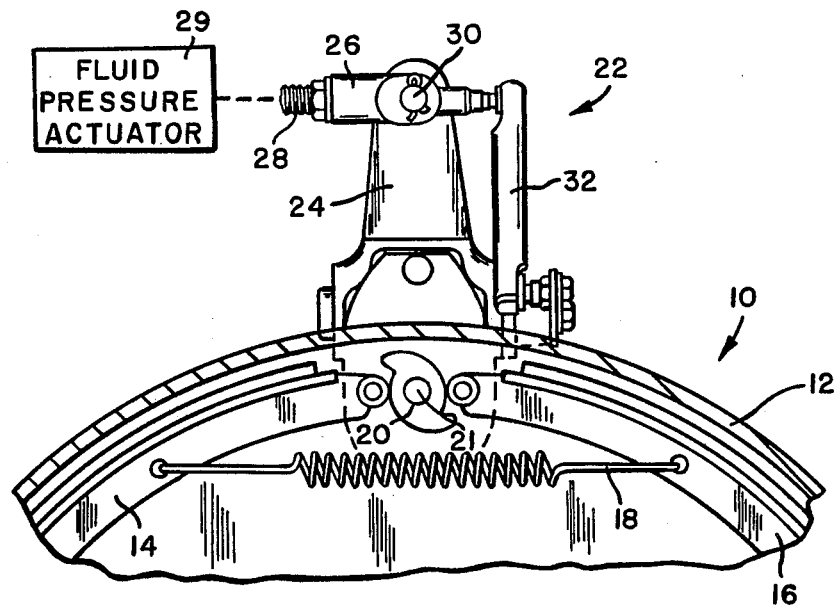
FIG. 1 is a fragmentary plan view, partly in section, of a cam-actuated brake having an automatic slack adjuster.

Referring now to FIG. 1 of the drawings, a cam actuated brake assembly generally indicated by the numeral 10 includes a drum 12 which is mounted for rotation with a vehicle wheel, and a pair of brake shoes 14, 16 which are yieldably urged away from the drum 12 by a return spring 18. A cam 20 is mounted on a cam shaft 21 and is disposed between contiguous ends of the brake shoes 14, 16. Upon rotation of the cam shaft 21, the cam 20 rotates to urge th shoes 14 and 16 apart and to braking engagement with the drum 12 in manner well know to the those skilled in the art. An automatic slack adjuster generally indicated by the numeral 22 includes a lever 24 which is mounted on the cam shaft 21, and is adapted to rotate cam shaft 21 when the lever 24 is rotated. The automatic slack adjuster 22 further includes a yoke member 26 which connects with an actuator thrust rod 28 which transmits linear motion of a fluid pressure actuator 29 which is well known to those skilled in the art and will not be described in detail herein. The lever 24 transfers the linear motion of the thrust rod 28 into rotary motion of the cam shaft 21. The yoke member 26 is pivotally connected to the lever 24 as at 30 it is also pivotally connected to a linkage assembly 32. Linkage assembly 32 is part of the automatic adjustment mechanism for the slack adjuster 22, and is effective upon rotation of the shoes 14 and 16 in an excessive amount during braking application to index the brake release position of the shoes 14, 16 so that they are closer to the drum 12, thereby maintaining the released clearance of the brake shoes 14 and 16 which respect to the drum 12 at a substantially constant motion.

The thrust rod 28 is normally connected to the yoke member 26 when the thrust rod 28, the aforementioned fluid actuator (not shown), and the automatic slack adjuster 22 are already mounted on the vehicle. It will readily be appreciated by those skilled in the art that the connection between the thrust rod 28 and the yoke assembly 26 can sometimes be quite difficult, particularly in installations in tight spaces where the length of thrust rod 28 is relatively short. Furthermore, the connection between the yoke member 26 and the thrust rod 28 is oftentimes disconnected when the brake is serviced. Accordingly, the mechanic must be able to both quickly disconnect and quickly reconnect the thrust rod 28 to the yoke member 26.

Figure 2:
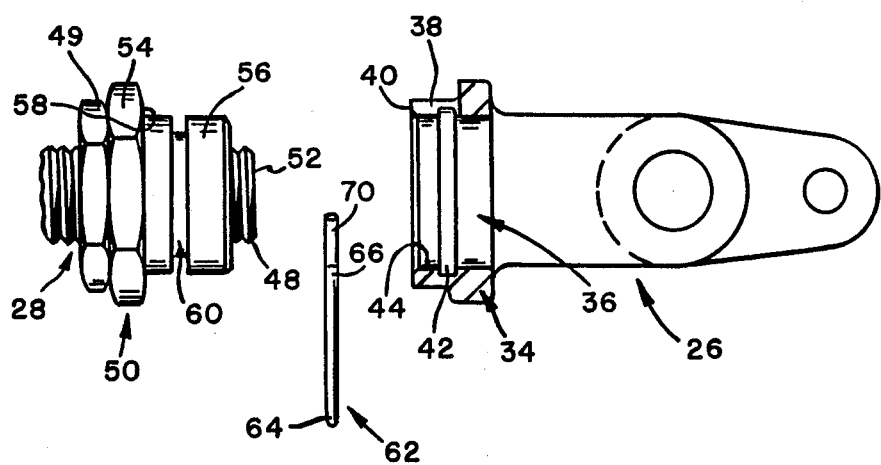
FIG. 2 is a view illustrating a mechanism made pursuant to the teachings of the present invention for connecting the slack adjuster yoke assembly and the actuator thrust rod, the various components being illustrated in positions which they assume just prior to connection of the thrust rod to the yoke assembly.
Figure 3:
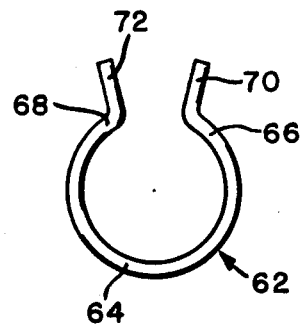
FIG. 3 is a plan view of the retaining ring used in the present invention.
Figure 4:
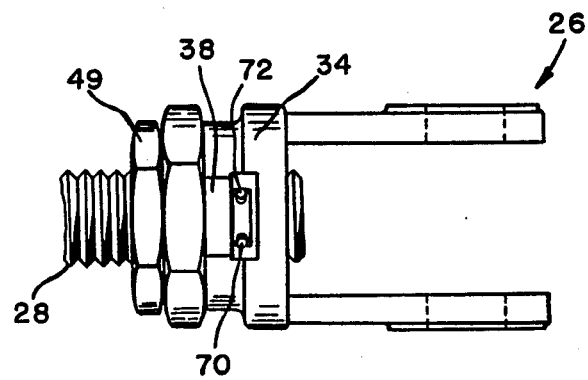
FIG. 4 is a top plan view, partly in section, illustrating the various components of the present invention in the positions which they assume when the thrust rod has been assembled to the yoke member.

Referring now to FIGS. 2-4, the connection mechanism of the present invention will be described in detail. The yoke member 26 terminates in an enlarged portion 34 which defines a recess generally indicated by the numeral 36. The enlarged portion 34 includes a circumferentially extending arcuate slot 38 that extends part of the way around the periphery of the yoke member 26, and which opens axially along the forward face 40 of the yoke member 26. As will be described, the forward face 40 defines a thrust receiving surface through which braking thrust is transmitted to the yoke member 26. A circumferentially extending groove 42 circumscribes the inner circumferential surface 44 of enlarged portion 34 of the yoke member 26, and is offset a small distance axially from the forward face 40.

The thrust rod 28 transmits linear motion of the aforementioned fluid actuator (not shown) to the yoke member 26. Thrust rod 28 includes a threaded section 48. A conventional nut 49 and a threaded adapter member generally indicated by the numeral 50 are threaded on the threaded section 48 of rod 28, and are movable toward and away from the end 52 of the rod 28 when rotated. The nut 49 is tightened against the adapter member 50 to lock it in place on the thrust rod 28. A hex-nut portion 54 of adapter member 50 cooperates with a reduced diameter portion 56 of the adaptor member 50 to define a shoulder 58 therebetween. The shoulder 58 defines a thrust transmitting surface which engages the thrust receiving surface 40 on yoke member 26 when the trust rod 28 is fastened to the yoke member 26 as will be hereinafter described. A circumferentially extending groove 60 circumscribes the reduced diameter portion 56 and is offset axially from the thrust transmitting surface 58 substantially the same distance that the groove 42 is offset from the thrust receiving surface 40. Engagement of the thrust transmitting surface 58 with the thrust receiving surface 40 defines the thrust transmitting engagement between the rod 28 and the yoke member 26. A non-thrust transmitting connection between the adapter member 50 and yoke member 26 is provided by a retaining ring 62, which engages both of the grooves 60 and 42 when the adapter member 50 is attached to the yoke member 26.

Referring now to FIG. 3, the retaining ring 62 is made from resilient wire. The retaining ring 62 includes a circumferentially extending portion 64 which, in its free state, has an inner diameter slightly less than that of the portion 56 of adapter member 50, but greater than the diameter of the root of groove 60. The outer diameter of the circumferentially extending portion 64 is greater than the root of groove 42 of portion 34 of yoke member 26. A segment of the circumferentially extending portion 64 retaining ring 62 is cut away to define circumferentially spaced ends 66, 68 of the circumferentially extending portion 64. The ends 66, 68 terminate in radially projecting extensions 70, 72. Accordingly, when the extensions 70, 72 are squeezed together thereby bringing the circumferentially spaced ends 66, 68 toward one another, the retaining ring 62 contracts radially, but when the extension 70, 72 are released, the resiliency of the retaining ring causes the latter to expand radially into the free state illustrated.

Accordingly, when the trust rod 28 is to be installed into the yoke member 26, the adapter member 50 is threaded along the thrust rod 28 into its approximate final location and locked in place by tightening nut 49 against adapter member 50. The retaining ring 62 is then installed on adapter member 50, it being noted that the retaining ring 62 is sufficiently flexible to permit the ends 66, 68 to move away from one another to allow the retaining ring to be slipped over reduced diameter portion 56 into the groove 60. The extension 70, 72 are then squeezed together to force the inner diameter of the circumferentially spaced portion 64 retaining ring 62 toward the root or inner surface of groove 60, such that the outer diameter of the circumferentially extending portion 64 is less than the diameter defined by the circumferentially extending surface 44 of the yoke member 26, thereby allowing the reduced diameter portion 56 of the adapter member 50 to be inserted into the opening 36. Of course, care must be taken to assure that the extension 70, 72 engages with the slot 38.

When the grooves 60, 42 are brought into substantial registry with one another, the extensions 70, 72, are released, thereby permitting the retaining ring 62 to expand towards its free state illustrated in FIG. 3. When the extensions 70, 72 ore released, the root of groove 42 limits expansion of the retaining ring 62, so that approximately one half of the diameter of section 64 is received in groove 42 and the other one half of the section 64 is received in the groove 60, thereby providing a connection between the adapter member 50 and the yoke member 26. Because the retaining ring is relatively weak, this connection does not transmit braking thrust, but the width of the grooves, 42, 66 are sufficiently greater than the width of the circumferentially extending portion 64 of the retaining ring 62 to permit the adaptor member 50 to be rotated slightly relative to the yoke member 26, so that braking thrust can be transmitted directly to the yoke member 26 through the surfaces 58, 40 thereby relieving the retaining ring 62 from taking braking thrust.

We claim:

1. Brake actuating system comprising a brake actuating lever, a yoke member pivotally connected to said lever, a thrust rod for transmitting brake actuating forces to said lever through said yoke member for urging said lever in brake application effecting and brake releasing directions, and means attaching said thrust rod to said yoke member, said attaching means including an adapter member mounted for movement along said thrust rod, said adapter member including a force transmitting surface cooperating with a corresponding thrust receiving surface on said yoke member to transmit braking thrust to the yoke member when the thrust rod is connected to said yoke member through said adapter member, said adapter member and a releasable connection between said members that does not transmit braking thrust, said releasable connection including an expandable and contractable device carried by one of said members that engages the other member when said thrust rod is connected to said yoke member and which is contractable to release said releasable connection when the thrust rod is disconnected from said yoke member, said yoke member defining a circumferentially extending arcuate slot, said slot opening axially through said corresponding surface on the yoke, said device including means projecting through said slot for contracting said device, said projecting means being movable through the corresponding surface on the yoke when the device is contracted and the thrust rod is disconnected from said yoke member.

2. Brake actuating system as claimed in claim 1, wherein releasable connection includes a pair of cooperating, radially offset grooves on said members, said expandable and contractable device being contracted to permit alignment of said groove and then expanded to engage the grooves on the other member.

3. Brake actuating system as claimed in claim 2, wherein the depth of the groove in said other member is less than the thickness of the compressable device so that the compressable device projects from the groove in the other member and into the groove in the one member when the thrust rod is connected with the yoke member.

4. Braking actuating system as claimed in claim 3, wherein the compressable device is a circumferentially extending, resilient retaining ring, said ring expanding radially because of the resilience thereof to engage the groove in the other member and being contractable radially to disengage the groove in the other member.

5. Brake actuating system as claimed in claim 4, wherein a segment of said retaining ring has been removed to define a pair of circumferentially spaced ends of the ring, said ring being contracted by urging the ends of the ring together, said ring expanding when the ends of the ring are released, said circumferentially spaced ends terminating in radially projecting extensions extending through said slot, said extensions comprising said projecting means.

6. Brake actuating system as claimed in claim 5, wherein said one member is the yoke member and the other member is the adapter member.

7. Brake actuating system as claimed in claim 1, wherein said device is a circumferentially extending retaining ring that is expandable and contractable radially to engage and disengage the other member.

8. Brake actuating system as claimed in claim 7, wherein a segment of said retaining ring has been removed to define a pair of circumferentially spaced ends of the ring, said ring being contracted by urging the ends of the ring together, said ring expanding when the ends of the ring are released, said circumferentially spaced ends terminating in radially projecting extensions extending through said slot, said extensions comprising said projecting means.

9. Brake actuating system comprising a brake actuating lever, a yoke member pivotally connected to said lever, a thrust rod for transmitting brake actuating forces to said lever through said yoke member for urging said lever in brake application effecting and brake releasing directions, and means attaching said thrust rod to said yoke member, said attaching means including an adapter member mounted for movement along said thrust rod, said adapter member including a force transmitting surface cooperating with a corresponding thrust receiving surface on said yoke member to transmit braking thrust to the yoke member when the thrust rod is connected to said yoke member through said adapter member, and releasable connection between said members that does not transmit braking thrust, said releasable connection including a circumferentially extending, resilient, radially expandable and contractable retaining ring carried by one of said members that expands radially to engage the other member when said thrust rod is connected to said yoke member and which is contractable radially to release said releasable connection when the thrust rod is disconnected from said yoke member, said yoke member defining a circumferentially extending arcuate slot, said slot opening axially through said corresponding thrust receiving surface on the yoke, said retaining ring including means projecting through said slot for contracting said retaining ring, said projecting means being movable through the corresponding surface on the yoke when the retaining ring is contracted and the thrust rod is disconnected from said yoke member.

10. Brake actuating system as claimed in claim 9, wherein a segment of said retaining ring has been removed to define a pair of circumferentially spaced ends of the ring, said ring being contracted by urging the ends of the ring together, said ring expanding when the ends of the ring are released, said circumferentially spaced ends terminating in radially projecting extensions extending through said slot, said extensions comprising said projecting means.

11. Brake actuating system as claimed in claim 10, wherein said one member is the yoke member and the other member is the adapter member.

* * * * *